United States Patent [19]

Ben-Yair et al.

[11] Patent Number: 5,587,904
[45] Date of Patent: Dec. 24, 1996

[54] AIR COMBAT MONITORING SYSTEM AND METHODS AND APPARATUS USEFUL THEREFOR

[75] Inventors: Igal Ben-Yair, Tel Aviv; Haim Berger, Ganei Tikva; Oleg Perelmuter, Rishon Lezion, all of Israel

[73] Assignee: Israel Aircraft Industries, Ltd., Lod, Israel

[21] Appl. No.: 258,973

[22] Filed: Jun. 10, 1994

[30] Foreign Application Priority Data

Jun. 11, 1993 [IL] Israel ........................................ 105991

[51] Int. Cl.$^6$ ................................ G09B 9/08; G09B 9/16
[52] U.S. Cl. ................................ 364/449.7; 364/424.06; 364/453; 364/461; 434/14
[58] Field of Search ........................ 364/423, 424.01, 364/424.06, 461, 462, 429, 454, 578, 453; 434/11, 14, 35, 30, 14; 89/41.01; 340/988; 342/14; 455/39; 273/439; 375/1; 244/3.14

[56] References Cited

U.S. PATENT DOCUMENTS

| | | |
|---|---|---|
| 4,442,491 | 4/1984 | Olhausen, Jr. .................... 364/454 |
| 4,729,737 | 3/1988 | Reagan et al. ....................... 434/35 |
| 4,741,245 | 5/1988 | Malone ............................... 89/41.03 |
| 5,228,854 | 7/1993 | Eldridge ............................... 434/11 |
| 5,240,416 | 8/1993 | Bennington ......................... 434/30 |
| 5,271,034 | 12/1993 | Abaunza ................................ 375/1 |
| 5,272,652 | 12/1993 | Rosenshein et al. ............... 364/578 |
| 5,308,022 | 5/1994 | Cronkhite et al. ................ 244/3.14 |
| 5,325,302 | 6/1994 | Izidon et al. ....................... 364/461 |
| 5,378,155 | 1/1995 | Eldridge ............................... 434/11 |
| 5,428,530 | 6/1995 | Brown et al. .................. 364/424.01 |

FOREIGN PATENT DOCUMENTS 4026207   2/1992   Germany.

Primary Examiner—Kevin J. Teska
Assistant Examiner—Russell W. Frejd
Attorney, Agent, or Firm—Helfgott & Karas PC

[57] ABSTRACT

An air combat monitoring system comprising a plurality of GPS receivers, mountable on a corresponding plurality of aircraft, an avionics monitor for monitoring the avionics systems of the plurality of aircraft, a memory for storing information received from the GPS receivers indicating the location of the plurality of aircraft and information received from the avionics monitor in order to provide a reviewable output indication of the performance of the plurality of aircraft and an information disseminator for communicating said information among said plurality of aircraft.

16 Claims, 3 Drawing Sheets

AIR COMBAT MONITORING SYSTEM AND METHODS AND APPARATUS USEFUL THEREFOR

FIELD OF THE INVENTION

The present invention relates to air combat monitoring systems and operational situation awareness systems generally.

BACKGROUND OF THE INVENTION

Conventional air combat monitoring systems include the Cubic ACMI, commercially available from Cubic Interstate.

Situation awareness systems are known, such as the JTID system developed by the U.S. Air Force.

SUMMARY OF THE INVENTION

The present invention seeks to provide an improved system for monitoring air combat. The system is preferably rangeless and has no geographical limitation. The system need not be used in a specific or constant location but rather can be used in substantially any location, including above the sea.

The system preferably provides air to air and air to ground debriefing even at low levels, preferably in real time, i.e. while a sortie is in progress, and off-line, by reconstructing a completed sortie.

Preferably, the system is suitable for monitoring a plurality of types of combat aircraft without requiring substantial modification of either the hardware or the software of the aircraft. The system preferably includes a small retrofit element which monitors the aircraft. The retrofit element may, for example, be integrally installed in an aircraft as an additional avionic subsystem or be provided as a pod disposed under the wing of the aircraft.

There is provided in accordance with a preferred embodiment of the present invention an air combat monitoring system including a plurality of GPS receivers, mountable on a corresponding plurality of aircraft, an avionics monitor for monitoring the avionics systems of the plurality of aircraft, a memory for storing information received from the GPS receivers indicating the location of the plurality of aircraft and information received from the avionics monitor in order to provide a reviewable output indication of the performance of the plurality of aircraft, and an information disseminator for communicating the information among the plurality of aircraft.

Additionally in accordance with a preferred embodiment of the present invention the information disseminator is operative to ensure that all of the information relating to the plurality of aircraft is stored.

Further in accordance with a preferred embodiment of the present invention the memory is mountable on the aircraft and the information disseminator is operative to ensure that all of the information relating to the plurality of aircraft is stored at a location mountable on each aircraft.

Still further in accordance with a preferred embodiment of the present invention the memory is ground based and the information disseminator is operative to ensure that all of the information relating to the plurality of aircraft is stored at a location mountable on each aircraft.

Also in accordance with a preferred embodiment of the present invention the system includes an information integrator for integrating information received from the GPS receivers, indicating the location of the plurality of aircraft, and information received from the avionics monitor in order to provide an output indication of the performance of the plurality of aircraft.

Additionally in accordance with a preferred embodiment of the present invention the information integrator is aircraft mountable.

There is also provided in accordance with a preferred embodiment of the present invention an air combat monitoring system including a GPS receiver, mountable on an aircraft, an avionics monitor for monitoring the avionics systems of the aircraft, a memory for storing information received from the GPS receivers, indicating the location of the aircraft, and information received from the avionics monitor, and an information integrator, mountable on the aircraft, for integrating information received from the GPS receivers, indicating the location of the aircraft, and information received from the avionics monitor in order to provide a reviewable output indication of the performance of the plurality of aircraft in a simulated combat context.

Further in accordance with a preferred embodiment of the present invention the information integrator is operative to integrate information relating to aircraft in the vicinity of a given aircraft.

Still further in accordance with a preferred embodiment of the present invention the information integrator is operative to provide warning of impending mid air collisions.

Additionally in accordance with a preferred embodiment of the present invention, the system includes an airborne weapons performance simulator.

Also in accordance with a preferred embodiment of the present invention the system includes a weapons performance indicator for providing an output indication to an aircraft operator of weapons performance achieved by him.

In accordance with a preferred embodiment of the present invention the system also includes an airborne pilot weapon delivery evaluation unit operative to compute the location of an aiming cross (CCIP) relative to at least one ground target, at the time at which a weapon was delivered.

Further in accordance with a preferred embodiment of the present invention the system includes a safety warning indicator for providing safety warnings to an aircraft operator.

Still further in accordance with a preferred embodiment of the present invention the safety warnings include at least one of the following warnings imminent departure from a predetermined safe flight envelope, imminent terrain collision, and imminent entry into forbidden airspace.

There is additionally provided in accordance with a preferred embodiment of the present invention a situation awareness system including a plurality of GPS receivers, mountable on a corresponding plurality of aircraft, an avionic systems monitor for monitoring the avionics systems of the plurality of aircraft, and an information integrator mountable on each aircraft for integrating information received from the GPS receivers indicating the location of the plurality of aircraft and information received from the avionics monitor, indicating operating parameters of the plurality of aircraft in order to provide a real time output indication to the aircraft pilot of the location of the plurality of aircraft.

Also in accordance with a preferred embodiment of the present invention GPS signals are employed for synchronization of the aircraft mounted apparatus on a plurality of aircraft.

Additionally in accordance with a preferred embodiment of the present invention time division multiplexing is employed for communication among a plurality of aircraft.

Further in accordance with a preferred embodiment of the present invention a plurality of GPS receivers mounted on a corresponding plurality of aircraft are operative to determine the relative positions of a plurality of aircraft to a higher accuracy than that provided by the GPS transmissions received thereby.

There is still further provided in accordance with a preferred embodiment of the present invention apparatus for computing relative position of a self-aircraft to an other-aircraft, the apparatus including a synchronization unit operative to synchronize time periods between the self-aircraft and the other-aircraft, a transmitter operative to transmit self-navigational data to the other-aircraft once during each individual time period, self-navigational data pertaining to the beginning of the individual time period, a receiver operative to receive other-navigational data from the other-aircraft once during each individual time period, the other-navigational data pertaining to the beginning of the individual time period, and a relative position computation unit operative to compare the received other-navigational data pertaining to the beginning of each individual time period to the self-navigational data pertaining to the beginning of the individual time period.

Further in accordance with a preferred embodiment of the present invention the airborne weapons performance simulator includes an air-to-air weapons performance simulator.

Still further in accordance with a preferred embodiment of the present invention the airborne weapons performance simulator includes an air-to-ground weapons performance simulator.

There is also provided in accordance with a preferred embodiment of the present invention a method for computing relative position of a self-aircraft to an other-aircraft, the method including the steps of synchronizing time periods between the self-aircraft and the other-aircraft, transmitting self-navigational data to the other-aircraft once during each individual time period, the self-navigational data pertaining to the beginning of the individual time period, and receiving other-navigational data from the other-aircraft once during each individual time period, the other-navigational data pertaining to the beginning of the individual time period, and comparing the received other-navigational data pertaining to the beginning of each individual time period to the self-navigational data pertaining to the beginning of the individual time period.

There is further provided in accordance with a preferred embodiment of the present invention an air combat monitoring system mounted on an aircraft and including an input unit operative to store information received pre-mission regarding terrain contours, and a terrain collision warning unit operative to receive information regarding the avionics status of the aircraft and to generate a warning of an impending collision of the aircraft with the terrain.

There is still further provided in accordance with a preferred embodiment of the present invention an air combat monitoring system mounted on an aircraft and including an input unit operative to receive information regarding the avionics status of the aircraft and of other aircraft in its vicinity, and an aircraft collision warning unit operative to generate a warning of an impending collision of the aircraft with another aircraft.

Also provided in accordance with a preferred embodiment of the present invention is an on-board situation awareness system mounted on an individual aircraft including an aircraft location data unit for receiving aircraft location data directly from individual ones from among the plurality of aircraft and for sending aircraft location data to individual ones from among the plurality of aircraft, an on-board situation awareness unit operative provide an indication of locations of the individual aircraft and of locations of other aircraft.

Further in accordance with a preferred embodiment of the present invention the aircraft location data unit is operative to receive aircraft location data regarding a plurality of aircraft within communication range of the individual aircraft.

There is additionally provided in accordance with a preferred embodiment of the present invention GPS navigation apparatus including a differential GPS unit operative to receive ongoing pseudo-range corrections from a ground station and using them to improve the accuracy of A/C position data.

There is also provided, in accordance with another preferred embodiment of the present invention, a combat aircraft information loading system including a removably mountable memory which is configured and arranged to receive information pertaining to flying conditions at a ground-based unit and subsequently to be mounted in an aircraft.

There is also provided, in accordance with another preferred embodiment of the present invention, a combat aircraft information loading system including a removably mountable electronic avionic data memory operative to record electronic avionic data, and an airborne memory-aircraft interface which is operative to transfer electronic avionic data from an aircraft to the avionic data memory when the memory is mounted on the aircraft.

There is also provided, in accordance with yet another preferred embodiment of the present invention, an air combat monitoring method including the steps of providing a plurality of GPS receivers, mountable on a corresponding plurality of aircraft, monitoring the avionics systems of the plurality of aircraft, storing information received from the GPS receivers indicating the location of the plurality of aircraft and information received from the avionics monitor in order to provide a reviewable output indication of the performance of the plurality of aircraft, and communicating the information among the plurality of aircraft.

There is also provided, in accordance with a further preferred embodiment of the present invention, an air combat monitoring method including the steps of providing a GPS receiver, mounted on an aircraft, monitoring the avionics systems of the aircraft, storing information received from the GPS receivers, indicating the location of the aircraft, and information received from the avionics system of the aircraft, and integrating information received from the GPS receivers, indicating the location of the aircraft, and information received from the avionics monitor in order to provide a reviewable output indication of the performance of the plurality of aircraft in a simulated combat context.

There is also provided, in accordance with another preferred embodiment of the present invention, a method for computing relative position of a self-aircraft to an other-aircraft, the method including the steps of synchronizing time periods between the self-aircraft and the other-aircraft, transmitting self-navigational data to the other-aircraft once during each individual time period, self-navigational data pertaining to the beginning of the individual time period, receiving other-navigational data from the other-aircraft once during each individual time period, the other-navigational data pertaining to the beginning of the individual time period, and comparing the received other-navigational data pertaining to the beginning of each individual time period to the self-navigational data pertaining to the beginning of the individual time period.

There is further provided, in accordance with another preferred embodiment of the present invention, an air combat monitoring method, operative on an aircraft, and including the steps of receiving information regarding the avionics status of the aircraft and of other aircraft in its vicinity, and generating a warning of an impending collision of the aircraft with another aircraft.

There is also provided, in accordance with another preferred embodiment of the present invention, a combat aircraft information loading method including the steps of providing a removably mountable memory which is configured and arranged to receive information pertaining to flying conditions at a ground-based unit and subsequently to be mounted in an aircraft.

There is additionally provided, in accordance with another preferred embodiment of the present invention, a combat aircraft information loading method including the steps of providing a removably mountable electronic avionic data memory operative to record electronic avionic data, and transferring electronic avionic data from an aircraft to the avionic data memory when the memory is mounted on the aircraft.

BRIEF DESCRIPTION OF THE DRAWINGS AND APPENDICES

The present invention will be understood and appreciated from the following detailed description, taken in conjunction with the drawings and appendices in which.

DETAILED DESCRIPTION OF A PREFERRED EMBODIMENT

Figure 1:
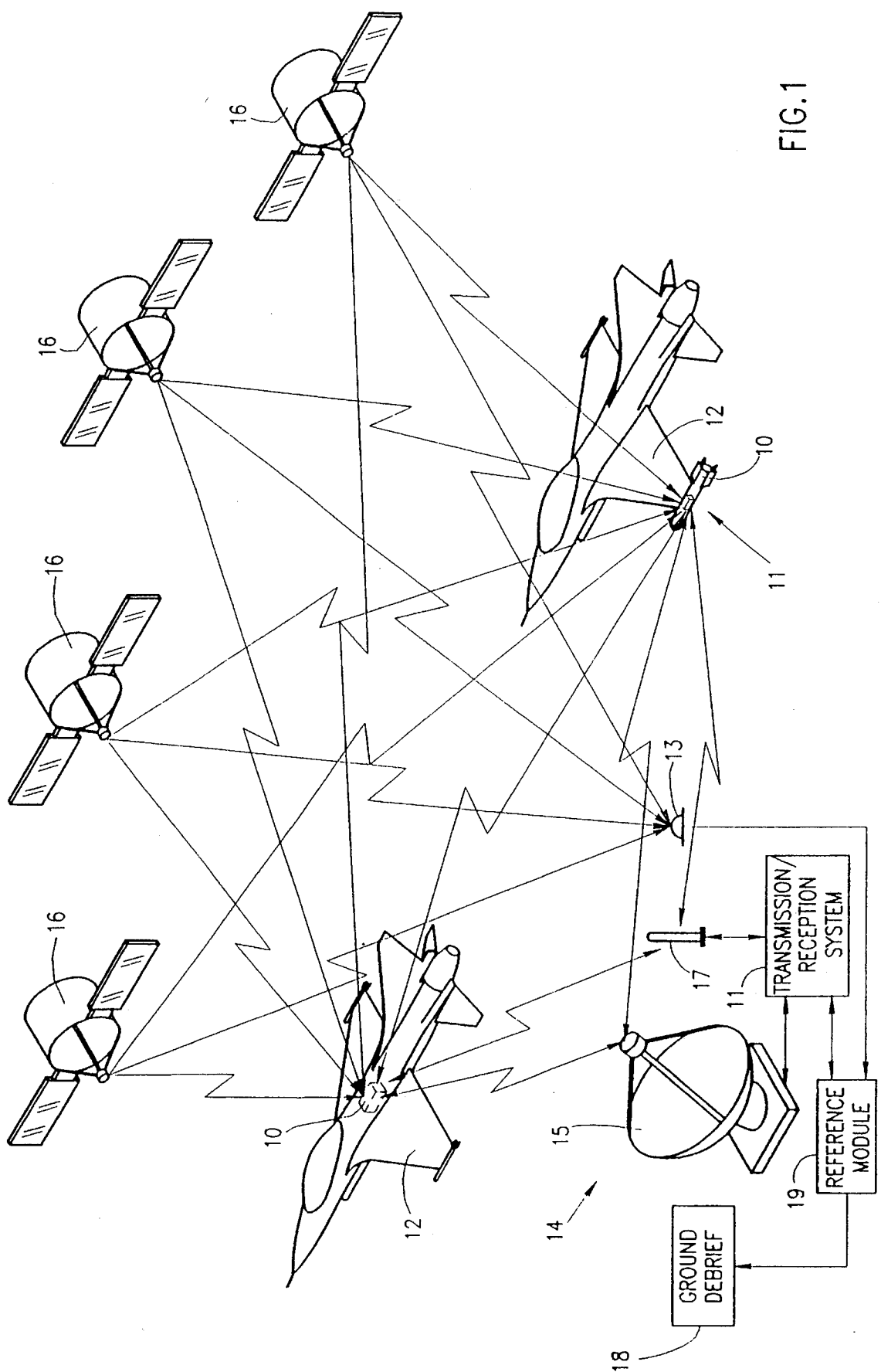
FIG. 1 is a pictorial illustration of an air combat monitoring system constructed and operative in accordance with a preferred embodiment of the present invention.

Reference is now made to FIG. 1, which illustrates an air combat monitoring system constructed and operative in accordance with a preferred embodiment of the present invention. The air combat monitoring system preferably includes a plurality of airborne monitoring and control modules 10 one of which is mounted on each of a plurality of aircraft 12. Such mounting may be in the form of a pod 11 which is mounted onto the wing of an aircraft. Alternatively, the module 10 may be located interiorly of the aircraft. Modules 10 on respective aircraft 12 are in communication with one another and, optionally, with a ground system. The optional ground system typically including the following elements:

a. a transmission/reception system 11;

b. a GPS antenna 13;

c. one or more ground antennae 14 operatively associated with transmission/reception system 13. Preferably, ground antennae 14 include a directional antenna 15 and an omnidirectional antenna 17;

d. a reference module 19 operatively associated with the GPS antenna 13 and, preferably, with a ground debriefing station 18. The reference module 19 may include the following units, described below in detail with reference to FIG. 2: GPS receiver 20; main processing module 23; voice synthesizer 33.

Ground antennae 14 is operative to receive information regarding an ongoing sortie so as to allow a real time presentation of the sortie to be provided by a ground station 18 associated with antennae 14.

In accordance with a preferred embodiment of the present invention, all of the airborne modules 10 include a GPS (global positioning system) receiver which receives navigational signals from one or more GPS satellites 16.

Preferably, at least one portable ground debriefing station 18 is provided. The portable ground debriefing station 18 receives data from antennae 14, if a real time presentation of a sortie is desired, and/or from removable data storage units which are mountable in the airborne module of each aircraft, as explained in detail below, if it is desired to provide post-sortie debriefing comprising an off-line playback of a sortie.

The apparatus of FIG. 1 also preferably includes a surface mounted reference module 19 in communication with antennae 14 which is operative to provide differential GPS navigation by means of a ground reference.

If ground reference module 19 is not provided, a selected one of the airborne modules 10 may serve as an airborne reference. This option is also termed herein "relative GPS" navigation because navigation is performed vis a vis a "relative" reference, i.e. an airborne module. Preferably, the selected airborne module, also termed herein the "master" module, is not a single airborne module. Instead, different airborne modules function as the "master" airborne modules at different times, depending on the usefulness, for the rest of the airborne modules, of the navigation and avionic data available to each airborne module. Specifically, each airborne module is preferably operative to rate its own capability to provide useful navigation data, preferably on the basis of one or more of the following criteria:

a. centrality of the aircraft's location relative to other aircraft;

b. centrality of the aircraft's location relative to a plurality of GPS satellites generating said GPS signals; and c. operativity of the navigation system on the aircraft on which the airborne module is mounted.

Each airborne module transmits its rating of its own capability to provide useful navigation data to other airborne modules and receives from other airborne modules their respective ratings of their own capabilities to provide useful navigation data to other airborne modules. Typically, each airborne module declines to serve as a master if it receives a higher rating than its own from at least one other airborne module.

The reference, i.e. ground reference module 19 or an airborne "master" module, is operative to correct inaccuracies in the signals received from GPS satellites 16.

Figure 2:
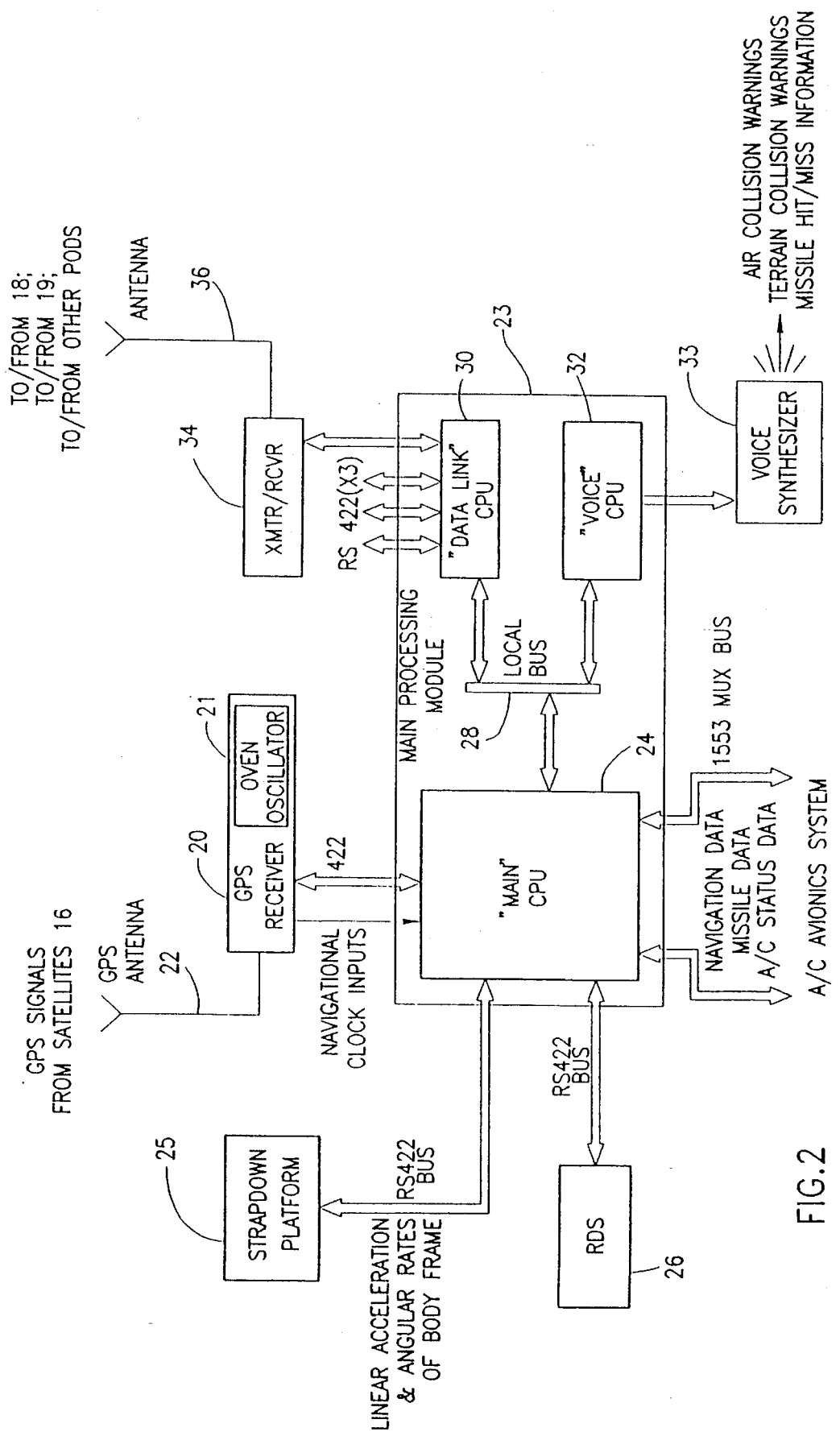
FIG. 2 is a simplified block diagram of an airborne monitoring and control module forming part of the air combat monitoring system of FIG. 1.

Reference is now made to FIG. 2, which illustrates in general terms, the structure of airborne module 10. As seen in FIG. 2, the module comprises a GPS receiver 20 which is coupled to a GPS antenna 22. The GPS receiver 20 and antenna 22 are operative to receive GPS navigational signals from satellites 16 of FIG. 1 and correction signals from a reference airborne module such as an airborne "master" airborne module or such as optional reference module 19.

GPS receiver 20 provides an indication of the location of each participating aircraft. If relative GPS navigation is employed, GPS receiver 20 also provides an evaluation of the capability of the airborne module to provide useful navigation information, relative to other airborne modules, as described in detail above. When the module 10 is located in a pod, the GPS antenna is preferably a wrap-around antenna. When module 10 is located inside the aircraft, the GPS antenna is located on the skin of the aircraft.

A particular feature of the present invention is that the GPS receiver is operative to receive GPS navigational signals from satellites 16 even in conditions of high dynamics which are characteristic of air combat situations, such as high velocity and/or high G, and even in extreme environmental conditions such as the presence of aircraft vibrations. The GPS receiver typically includes an oven oscillator 21 which allows operation under extreme environmental conditions.

The GPS receiver preferably has a variable, i.e. moving, relatively narrow RF (radio frequency) window which is typically responsive to aircraft velocity. The large signal-to-noise ratio of the narrow window allows the GPS signal to be picked up rapidly, despite Doppler effects occurring in conditions of high dynamics.

A main processing module 23 is provided which is described in detail below with reference to FIG. 3. In the present embodiment, main processing module 23 includes three Intel 486 processors, referenced herein as "main" CPU 24, "data link" CPU 30 and "voice" CPU 32, which interface with a local bus 28.

A strapdown platform unit 25, such as the Inertial Reference Unit (IRU) commercially available from TAMAM, Israel Aircraft Industries, Lod, Israel. The strapdown platform unit 25 provides INS data, including angular rates and linear accelarations of the aircraft, to main CPU 24 of main processing module 23, via an RS-422 bus. For aircraft with a 1553 Mux-bus, the INS data may be provided directly from the aircraft, as explained below with reference to FIG. 3, and strapdown platform unit 25 may be omitted or may serve as a backup in the event that no INS data is available from the aircraft.

A particular feature of main processing module 23 is that it utilizes both GPS and INS data in order to generate its output, thereby compensating for the shortcomings of each type of data. Specifically, INS data has high short-term accuracy but normally drifts over time, whereas GPS data has lower short-term accuracy but does not drift over time. Main processing module 23 smooths the GPS readings with the INS data, using a suitable method such as adaptive Kalman filtering. The result of combining the INS and GPS data is a smooth position vector for each aircraft.

The clock input transmitted from the GPS receiver 20 to main CPU 24 to the main processing module 23 provides system-wide synchronization for all airborne modules. The advantage of providing inter-airborne module synchronization is that all airborne modules navigate simultaneously and all airborne modules produce mutually compatible navigatzon and avionics output with uniform time tags. Also, like system-wide synchronization defines timing of communication slots for a data link 30, so that airborne module transmissions do not interfere with one another. Preferably, time division multiplexing (TDM) is employed to allow each airborne module to transmit its own navigation and avionic data pertaining to a selected point in time to other airborne modules. Preferably, all navigation, avionic and other data transmitted by all aircraft during an individual time interval pertains to the same point in time.

Main CPU 24 communicates via a 1553 MUX bus with the avionics system of aircraft 12 having a MUX bus 1553. The CPU also communicates with an external memory 26, also termed herein an "RDS" or "removable data storage unit", via an RS422 bus.

Memory 26 preferably comprises a solid state non-volatile memory for storing flight data generated by main processing module 23 and for storing pre-flight data fed into memory 26 by any suitable means such as by means of ground station 18 into which a user may previously input pre-flight data pertaining to the training area and/or to the sortie participants.

Memory 26 is installable, preferably removably, in the airborne module. Memory 26 may be, but is not necessarily, physically adjacent to the remaining elements of airborne module 10. Memory 26 preferably uses Flash memory technology and preferably does not require battery backup.

Memory 26 on the airborne module 10 of each individual aircraft preferably stores flight data for its own aircraft and also for all aircraft falling within a predetermined distance zone or bubble, such as a sphere of 40–200 km radius of its own aircraft.

A transceiver 34 having an antenna 36 is operative to transmit and receive transmissions to and from other airborne modules 10, and to and from ground debriefing station 18 and optional reference module 19 via antennae 14 of FIG. 1.

Voice CPU 32 is coupled to a voice synthesizer 33 which produces verbal safety warnings of hazardous situations such as imminent collision with another aircraft, imminent departure from a predetermined aerodynamically safe flight envelope, imminent collision with the terrain, and imminent entry into forbidden airspace.

Preferably, the voice synthesizer also provides the aircraft operator of a verbal indication of self-hits computed by a weapon performance simulating unit 190, described in detail below.

Figure 3:
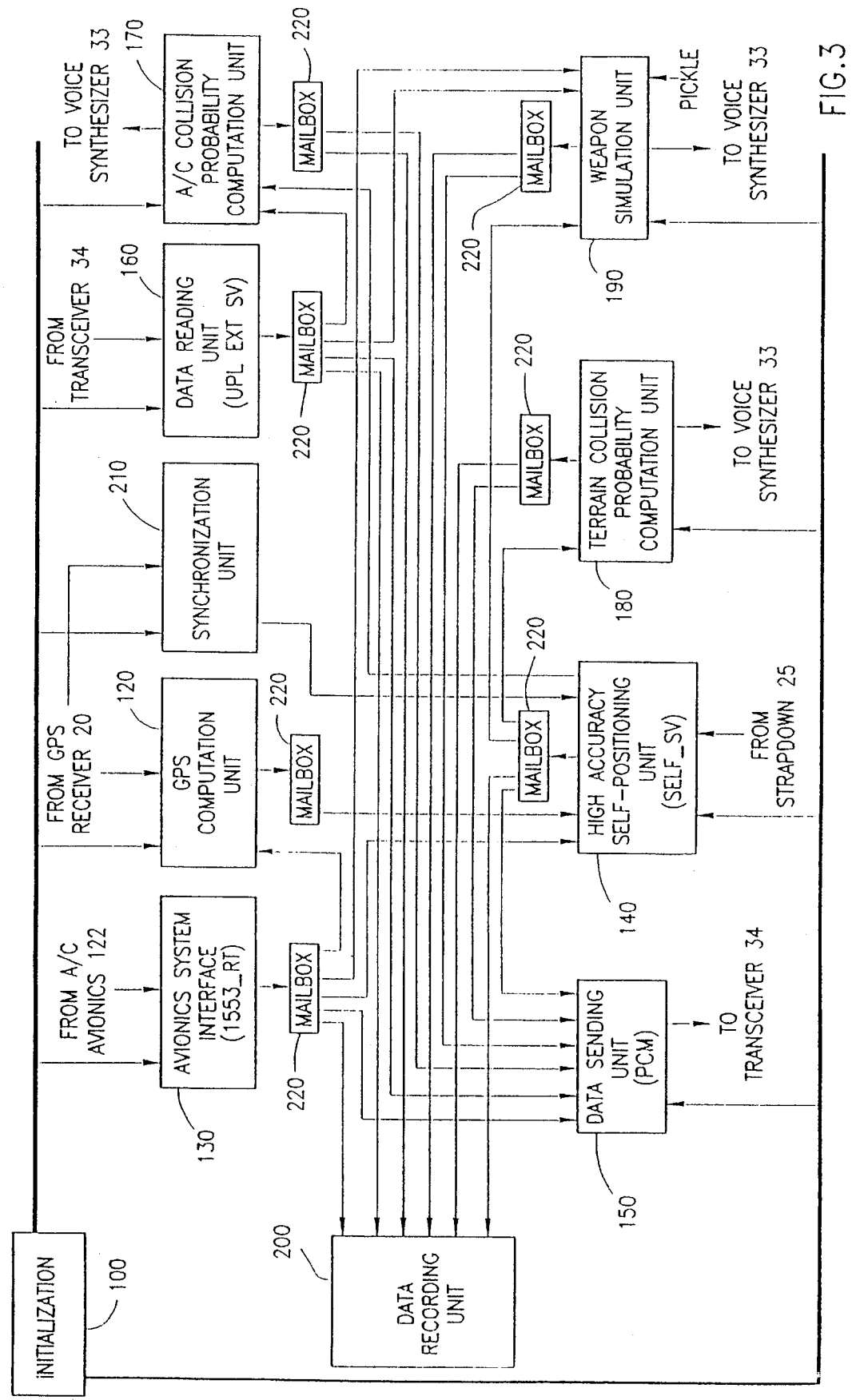
FIG. 3 is a simplified functional block diagram of a main processing module forming part of the airborne monitoring and control module of FIG. 2.

Reference is now made to FIG. 3 which is a functional block diagram of main processing module 23 of FIG. 2, interacting with a data recording unit 200 which is typically provided within RDS 26. It is appreciated that each function may be performed by any of processors 24, 30 and 32.

As shown, the main processing module 23 typically includes the following units:

An initialization unit 100 initializes all other units of main processing module 23.

A GPS computation unit 120, also termed herein "the GPS unit", receives GPS data from GPS receiver 20 of FIG. 2, including data pertaining to the actual positions of one or more satellites 16 and data pertaining to the relative position of the aircraft relative to the satellites.

An avionics system interface 130, also termed herein "the 1553 RT unit", receives data from the avionics system of the aircraft, via the 1553 bus of FIG. 2. The data received from the aircraft typically includes navigation data, also termed herein "INS data" and missile launching data. The navigation data typically includes three-dimensional linear position, velocity and acceleration vectors, and three-dimensional angular position, velocity and acceleration vectors. The missile launching data typically includes missile seeker angle data.

A high accuracy self-positioning unit 140, also termed herein "the SELF_SV unit", is operative to combine navigational data regarding the aircraft received from two sources:

i. navigational data pertaining the aircraft, received from the aircraft via unit 130 or, if this source is unavailable or has failed, from unit 25 of FIG. 1. The navigational data is typically accurate in the short-term but drifts in the long term; and ii. GPS data from GPS unit 120, which typically does not drift in the long term but is relatively inaccurate in the short term.

A data sending unit 150, also termed herein "the PCM (Pulse Code Modulation) unit", sends information regarding an individual aircraft, such as position, velocities, status and weapon results data computed by unit 140, to other aircraft, via antenna 36 and transceiver 34 of the other aircraft. Data sending unit 150 is preferably operative to send the information pertaining to an individual aircraft to all aircraft within a bubble of predetermined radius, such as 60 km, from the individual aircraft. Preferably, time division multiplexing (TDM) methods are employed to ensure that, within each bubble of predetermined radius, only one aircraft at a time is sending navigation and avionic data. Synchronization of data transmission may, for example, be implemented using a table, stored in memory, which stores, for each of a plurality of a time slots, an identification code of a airborne module which is to transmit information in that time slot.

Conversely, a data reading unit 160, also termed herein "the UPL $EXT_{13}SV$ unit" or the "data link" unit, reads other-aircraft data computed by unit 140 of another aircraft, from antenna 36 and transceiver 34 of its own aircraft.

The data regarding an individual aircraft sent by data sending unit 150 of the individual aircraft and received by the data reading units 160 of all aircraft within a bubble of predetermined radius therefrom preferably includes all of the following types of data:

navigation data from unit 140 of the individual aircraft; aircraft avionics data from unit 130 of the individual aircraft; warnings of impending collisions between the individual aircraft and other aircraft, which warnings are generated by unit 170 of the individual aircraft; hit indications due to a simulated missile launching by the pilot of the individual aircraft, which hit indications are generated by unit 190, described in detail below; and information, generated by unit 160, regarding the number and identities of aircraft within the bubble of the individual aircraft, which information is employed by unit 150 of each of the aircraft within the bubble in order to determine a data sending schedule.

An aircraft collision probability computation unit 170, also termed herein the COLLISION unit, receives navigation and avionic data regarding its own aircraft from unit 140 and navigation data regarding other aircraft from unit 160 and determines whether or not an "impending aircraft collision" alarm should be operated. Typically, unit 170 operates as follows:

a. A cone of possible future trajectories for the self-aircraft and for each other aircraft is computed, based on the navigation data.

b. All locations in the cone of an individual aircraft are preferably regarded as being of equal probability for that aircraft, since occurrence thereof depends on the pilot's decision. For each other aircraft, the probability that the "self" aircraft will collide with that aircraft is computed.

c. If the probability in b exceeds a particular threshold for at least one of the "other" aircrafts, the unit 170 instructs voice synthesizer 33 of FIG. 2 to activate an "impending aircraft collision" alarm.

A terrain collision probability computation unit 180, also termed herein the CARPET unit, stores pre-loaded data regarding the terrain over which the aircraft is flying and receives navigation data regarding the position and velocity of its own aircraft from unit 140. Unit 180 determines whether or not an "impending terrain collision" alarm should be operated. Typically, unit 180 operates as follows:

a. A cone of possible future trajectories for the self-aircraft is computed, based on the navigation data.

b. All locations in the cone of an individual aircraft are preferably regarded as being of equal probability for that aircraft, since occurrence thereof depends on the pilot's decision. The probability that the aircraft will collide with the ground is computed.

c. If the probability in b exceeds a particular threshold, the unit 180 instructs voice synthesizer 33 of FIG. 2 to activate an "impending terrain collision" alarm.

A weapon simulation unit 190, also termed herein the MISSILE unit, receives weapon launching data such as missile launching data from the avionics system of the aircraft via unit 130. Unit 190 initially determines which aircraft is the target of the missile by reviewing navigational data, received from unit 160, regarding all other aircraft. More generally, unit 190 simulates performance of any weapon. Alternatively, unit 190 may provide an evaluation of a pilot's performance in aligning an aiming cross (CCIP) with a target at the moment the weapon is operated, without simulating the trajectory of the weapon.

Unit 190 monitors performance of the target aircraft, including target engine performance and target countermeasures such as chaff and flares, and simulates the trajectory of the missile relative to the target aircraft in order to determine whether or not the missile will hit the target aircraft.

Notification of the hit/miss information is provided to the "self" pilot via voice synthesizer 33 and to the "target" pilot via data sender unit 150 and via the voice synthesizer 33 of the "target" pilot.

Data recording unit 200, also termed herein the RECORDING unit, records data regarding the sortie for accessing during post-sortie debriefing on the ground and provides it to RDS 26 of FIG. 2. Recorded data typically includes the following:

a. Missile launching data—when and in what direction each missile launched by the self-aircraft was launched. Missile simulation data is preferably not stored since it can be reconstructed on the ground.

b. Self-navigation data from unit 140. If an indication is received from unit 180 that the probability of a terrain collision is over a predetermined threshold, the data from unit 140 is saved at a higher rate, such as 10 times per second rather than 5 times per second.

c. Navigation data for other aircraft from unit 160.

If an indication is received from unit 170 that the probability of an aircraft collision is over a predetermined threshold, the data from unit 140 and from the relevant aircraft, from unit 160, is saved by recording unit 200 at a higher rate, such as 10 times per second rather than 5 times per second.

A synchronization unit 210 is operative to synchronize communications between participating aircraft, using time inputs from the GPS receivers 20, received via GPS unit 120.

A particular feature of the present invention is that navigational data exchanged between aircraft is synchronized. In other words, navigational and avionic data between aircraft is exchanged once every predetermined time period, such as once every 100 msec, however, regardless of the point within the 100 msec time period at which the navigational data is communicated to another aircraft, each aircraft communicates the navigational data pertaining to the beginning of the 100 msec time period. The time periods are synchronized by synchronization unit 210 for all aircraft.

Therefore, a good approximation of the relative positions of an aircraft relative to another aircraft may be obtained by comparing the navigational data received from the other aircraft at some point within a synchronized 100 msec time period, which pertains to the beginning of the 100 msec time period, with the self-navigational data from the beginning of the 100 msec time period. Because of the shortness of each time period, the relative positions of the two aircrafts vary little enough so that the above method generates a good approximation of relative position, without interpolating the received navigational data from the other aircraft, forward to the current time.

Preferably, communication between the various units of the apparatus of FIG. 3 is carried out via a plurality of "mail-boxes" 220.

A typical mode of operation of the apparatus of the present invention is as follows:

PREPARATION FOR FLIGHT a. For each of a plurality of RDS units 26 which have been assembled in the squadron, preflight data is loaded, typically by an operator serving the squadron, via a suitable input device such as a keyboard and/or mouse associated with an RDS load/unload rack.

The preflight data may include one, some or all of the following types of data:

i. digital terrain elevation data of the training area ii. information regarding locations of forbidden airspace;

iii. information regarding an aerodynamically safe flight envelope for the individual aircraft, which may be user-defined depending on at least the type of aircraft and the level of skill of the pilot.

iv. information defining criteria for providing a midair collision warning;

v. training rules;

vi. boundaries of firing zones;

vii. infrequently changed information such as the aircraft type's operational envelope.

b. A pilot embarking on a flight collects an RDS unit 26 from his squadron and installs it on the airborne module 10 of his aircraft. Thereby, the preflight data is entered into the memory of each airborne module 10 prior to flight.

Alternatively, if the data storage unit 26 is not removable, a computer may be brought into operative association with the data storage unit 26 while the aircraft is still on the ground, for example via a cable, and the preflight data may be loaded into the memory of each airborne module.

DURING FLIGHT c. To compute the position of the aircraft, the following input parameters are employed:

i. Differential or relative GPS data; and ii. INS data directly from the aircraft or from the SDP 25 within the airborne module 10.

d. Each airborne module 10 combines the digital terrain elevation data with the aircraft position data to generate real time terrain collision warnings.

e. During the sortie, real time debriefer 18 preferably communicates with the antenna 36 of each aircraft, thereby to provide real time indications of simulated weapon hits and real time indications of threats to flight safety, training rules, presence of a boundary, as well as general indications of the aerial situation.

f. Ground station 18 also preferably provides a real time aerial picture on the ground, which may be useful in monitoring inexperienced pilots as well as serving as a back-up to ground control.

g. The airborne modules 10 of participating aircraft intercommunicate in order to provide some or all of the following types of data: navigation data from unit 140 of the individual aircraft; aircraft INS data and status from unit 130 of the individual aircraft; warnings of impending collisions between the individual aircraft and other aircraft within its bubble, which warnings are generated by unit 170 of the individual aircraft; hit indications due to a simulated missile launching by the pilot of the individual aircraft, which hit indications are generated by unit 190; and information, generated by unit 160, regarding the number and identities of aircraft within the bubble of the individual aircraft, which information is employed by unit 150 of each of the aircraft within the bubble in order to determine a data sending schedule.

AFTER FLIGHT i. At the end of the flight, the pilot extracts the RDS unit from the airborne module 10 of his aircraft and places it in the RDS load/unload rack. Alternatively, if data storage unit 26 is not removable, the same data may be unloaded, once the aircraft is on the ground, onto a conventional computer, using conventional communication apparatus such as a cable.

j. The RDS's (removable data storage units) of all pilots are used for debriefing at ground station 18.

It should be noted that the originally filed application includes two appendices, Appendix A and Appendix B. Appendix A is a computer listing of a computer program operative to perform various functions of the invention. Appendix B is a description of hardware implemented in the invention. The appendices are not printed in the issued patent because the combined length of the appendices exceeds 500 pages, and they are not necessary for adequate disclosure of the claimed invention. The appendices are maintained at the Patent Office in the original file, and are available to the public for future reference, upon request in the usual manner.

It will be appreciated by persons skilled in the art that the present invention is not limited to what has been particularly shown and described hereinabove. Rather, the scope of the present invention is defined only by the claims that follow:

We claim:

1. An air combat monitoring system comprising:

a plurality of GPS receivers, mountable on a corresponding plurality of aircraft;

an avionics monitor mountable on each of the corresponding plurality of aircraft for monitoring the avionics systems of the aircraft;

a memory for storing information received from the GPS receivers indicating the location of the plurality of aircraft and information received from the avionics monitor in order to provide a reviewable output indication of the performance of the plurality of aircraft;

an information disseminator for communicating said information among said plurality of aircraft including means employing GPS signals for synchronization of aircraft mounted apparatus on the plurality of aircraft; and means employing time division multiplexing for communicating said information among the plurality of aircraft.

2. An air combat monitoring system according to claim 1, further comprising an information integrator for integrating time division multiplexed information received from the GPS receivers mounted on the plurality of aircraft, indicating the location of the plurality of aircraft, and information received from the avionics monitors of said aircraft in order to provide an output indication of the performance of the plurality of aircraft.

3. An air combat monitoring system according to claim 2, wherein said information integrator for integrating said time division multiplexed information is aircraft mountable.

4. An air combat monitoring system according to claim 1, further comprising an air-to-ground weapons performance simulator operative in conjunction with a ground unit for providing an output indication of air-to-ground weapons performance.

5. An air combat monitoring system according to claim 1, further comprising an airborne pilot weapon delivery evaluation unit operative in conjunction with a ground unit for computing a location of an aiming cross (CCIP) relative to at least one ground target, at a time at which a weapon was delivered.

6. An air combat monitoring system according to claim 1, further comprising a safety warning indicator for providing safety warnings to an aircraft operator on imminent departure from a predetermined safe flight envelope.

7. An air combat monitoring system according to claim 1, further comprising a safety warning indicator for providing safety warnings to an aircraft operator on imminent entry into forbidden airspace.

8. An air combat monitoring system according to claim 1, further comprising:

a transmitter operative to transmit self-navigational data to the other aircraft once during an individual synchronized time period, said self-navigational data pertaining to a selected point of time of the individual synchronized time period;

a receiver operative to receive other-navigational data from the other-aircraft once during each individual synchronized time period, the other-navigational data pertaining to said selected point of time of the individual synchronized time period; and a relative position computation unit operative to compare the received other-navigational data pertaining to said selected point of time of each individual synchronized time period to the self-navigational data pertaining to the selected point of time of the individual synchronized time period, for computing the relative position of the self-aircraft to the other-aircraft.

9. An air combat monitoring system according to claim 1, further comprising:

an aircraft collision warning unit operative to generate a warning of an impending collision of the aircraft with another aircraft.

10. An air combat monitoring system according to claim 1, further comprising:

a differential GPS unit operative to receive ongoing pseudo-range corrections from an airborne master on another aircraft;

an airborne master operative to transmit pseudo-range corrections to a differential GPS unit on another aircraft; and an airborne master controller operative to ensure that the airborne master transmits said corrections only when the aircraft on which the controller is mounted, is capable of generating said corrections.

11. An air combat monitoring system according to claim 10, wherein said controller includes a correction generation capability evaluator operative to evaluate whether the aircraft on which it is mounted is capable of generating said corrections, relative to other aircraft, according to at least one of the following criteria:

centrality of the aircraft's location relative to other aircraft;

centrality of the aircraft's location relative to a plurality of GPS satellites generating said GPS signals; and operativity of the navigation system on the aircraft on which the apparatus is mounted.

12. An air combat monitoring method comprising the steps of:

providing a plurality of GPS receivers, mountable on a corresponding plurality of aircraft;

monitoring the avionics systems of the plurality of aircraft;

storing information received from the GPS receivers indicating the location of the plurality of aircraft and information received from the avionics monitor in order to provide a reviewable output indication of the performance of the plurality of aircraft;

communicating said information among said plurality of aircraft;

synchronizing aircraft apparatus mounted on the plurality of aircraft by means of GPS signals received by said GPS receivers; and time division multiplexing data communicated among the plurality of aircraft.

13. An air combat monitoring method according to claim 12 further comprising the steps of:

transmitting self-navigational data to the other-aircraft once during an individual synchronized time period, said self-navigational data pertaining to a selected point of time of the individual synchronized time period;

receiving other-navigational data from the other-aircraft once during each individual synchronized time period, the other-nagivational data pertaining to the selected point of time of the individual synchronized time period; and comparing the received other-nagivational data pertaining to the selected point of time of each individual synchronized time period to the self-nagivational data pertaining to the selected point of time of the individual synchronized time period, for computing the relative position of the self-aircraft to the other-aircraft.

14. An air combat monitoring method according to claim 12, further comprising the step of:

generating a warning of an impending collision of the aircraft with another aircraft based on said information indicating aircraft location.

15. An air combat monitoring method according to claim 13 wherein said selected point of time is at the beginning of each individual synchronized time period.

16. An air combat monitoring system according to claim 8 wherein said selected point of time is at the beginning of each individual synchronized time period.

* * * * *

UNITED STATES PATENT AND TRADEMARK OFFICE
CERTIFICATE OF CORRECTION

PATENT NO. : 5,587,904
DATED : Dec. 24, 1996
INVENTOR(S) : Igal Ben-Yair et al

It is certified that error appears in the above-indentified patent and that said Letters Patent is hereby corrected as shown below:

On the Title page, item [30] should read as follows:
  Jun. 10, 1993 [IL] Israel..................105982

Signed and Sealed this

Fifth Day of August, 1997

Attest:

BRUCE LEHMAN

*Attesting Officer*    *Commissioner of Patents and Trademarks*